Dec. 21, 1937.  T. B. PRICKETT  2,102,644
TEMPERATURE CONTROL OF REACTION VESSELS
Filed April 1, 1935   2 Sheets-Sheet 1

INVENTOR.
Thomas B. Prickett
BY
Ira L. Nickerson
ATTORNEY.

Dec. 21, 1937. T. B. PRICKETT 2,102,644
TEMPERATURE CONTROL OF REACTION VESSELS
Filed April 1, 1935 2 Sheets-Sheet 2
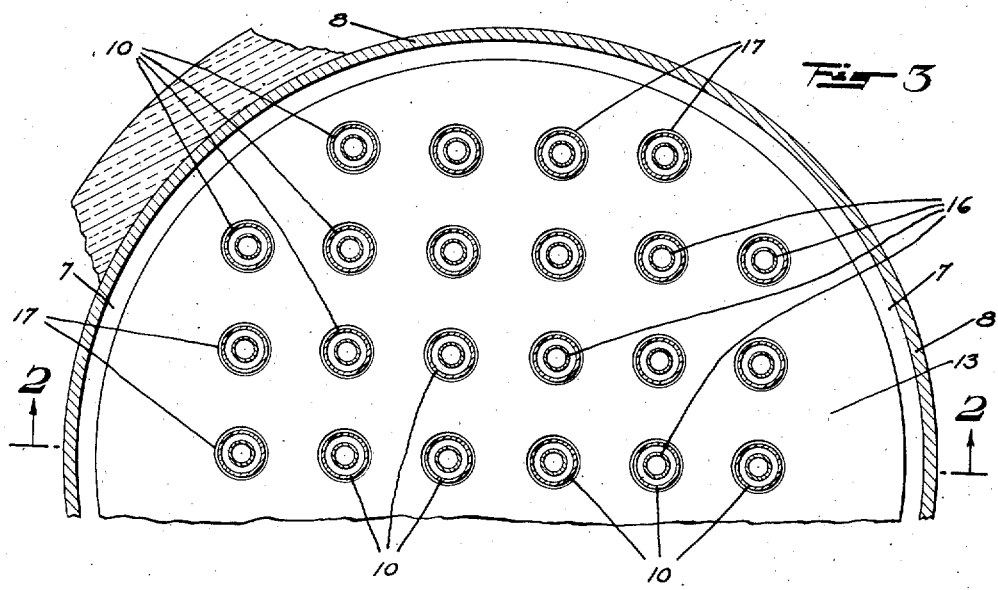
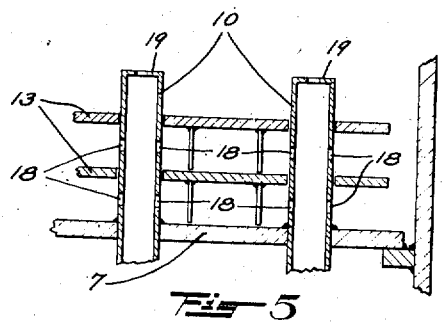
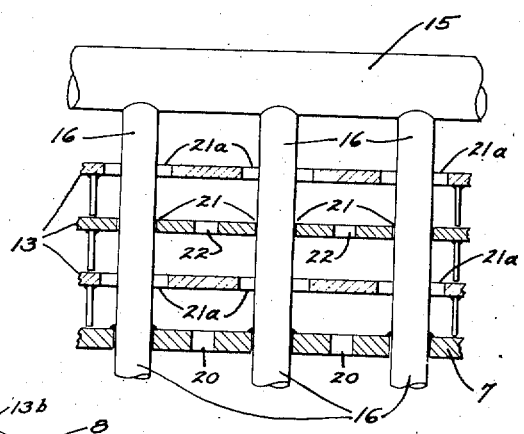
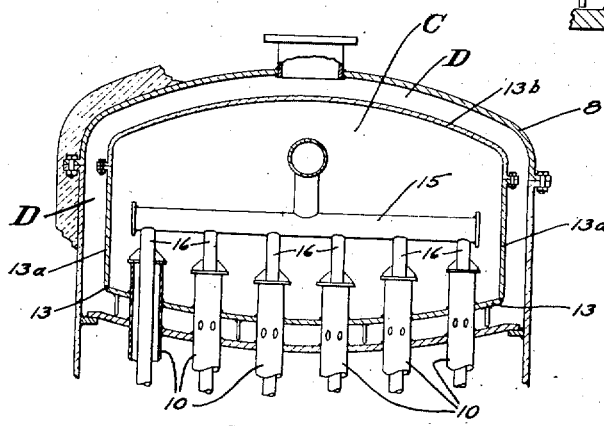
INVENTOR.
Thomas B. Prickett
BY
Ira L. Nickerson
ATTORNEY.

Patented Dec. 21, 1937

2,102,644

UNITED STATES PATENT OFFICE 2,102,644

TEMPERATURE CONTROL OF REACTION VESSELS

Thomas B. Prickett, Woodbury, N. J., assignor to Houdry Process Corporation, Dover, Del., a corporation of Delaware Application April 1, 1935, Serial No. 14,068

14 Claims. (Cl. 23—288)

This invention relates to converters for effecting chemical reactions involving the use of contact masses which may promote or in any way assist the reactions. It is concerned with temperature control of the mass. More particularly, it involves restriction of heat exchange between certain portions of the converter structure.

One object of the invention is to restrict heat exchange between the walls of the reaction chamber and portions of the converter structure disposed outside the chamber. Another object is to restrict heat exchange between the mass and a wall of the reaction chamber. Still another object is to restrict heat exchange between fluids about to enter or fluids leaving the reaction chamber and portions of a system conducting heating or cooling fluids through the chamber. Still another object is to provide efficient heat baffling means which do not present the disadvantages of conventional insulating materials. A still further object is to avoid stagnation of fluids. Still other objects will be apparent from the detailed description which follows.

In certain respects, the present invention may be considered as an improvement on or further development of the invention disclosed and claimed in U. S. Patent No. 1,987,904, issued to Eugene J. Houdry on January 15, 1935, which relates to the use of heat insulating material of cellular or fibrous nature in chemical converters. This type of material is sometimes unsatisfactory especially when it is deteriorated physically and/or chemically through absorption of fluids with which it comes in contact, as for example, fluids of a penetrating character or fluids at superatmospheric temperatures and/or pressures and which may or may not react chemically with the insulating material. In a converter handling inflammable fluids or fluids which deposit inflammable materials within the structure and on the surface of the insulating material, the latter, when it becomes saturated with these fluids, often presents a dangerous fire or explosion hazard. Heat insulating materials of the type described have been used successfully in converters handling deleterious fluids when they have been shielded or protected from the fluids by a fluid tight cover or the like. However, it is frequently difficult to design, install and maintain such covers.

The present invention contemplates efficient heat baffling means which do not have the disadvantage of insulating material of the type described and which present advantages over the latter both in simplicity of the converter structure and in the extent of its utility and application.

The invention involves one or more baffle plates in spaced relation with a wall or end of a reaction chamber. One form of the invention provides baffles in parallelism with a partition or flue sheet extending across the converter and defining one end of a reaction chamber containing a contact mass and one end of a contiguous fluid reservoir. The baffles may be interposed between the mass and the flue sheet and/or between the flue sheet and portions of the converter structure outside the reaction chamber. In some instances, the baffles are interposed between the mass and a fluid manifold in a system serving to conduct heating or cooling fluids through the reaction chamber. The flue sheet is preferably adapted to permit fluid communication between the reaction chamber and the reservoir. The baffles are preferably adapted to provide passage of fluids about to enter or fluids leaving the mass over or through them in a manner to prevent formation of pockets of stagnating fluids. When the baffles are disposed within the fluid reservoir they may be extended to form an inner shell in spaced relation with the converter shell and to provide a conducting path between the two shells for fluids about to enter or fluids leaving the mass.

Concrete embodiments of the invention are disclosed in the accompanying drawings, in which:

Fig. 3 is a partial transverse sectional view taken substantially along line 3—3 of Fig. 2, but shown on a slightly larger scale;

Fig. 4 is a view, on a reduced scale, shown partially in section and partially in elevation, of a modification of the converter portion shown in Fig. 2;

Fig. 5 is a fragmentary sectional view of a differently modified converter shown on a slightly larger scale than Figs. 1 and 2; and Fig. 6 is a view, on approximately the same scale as Fig. 5, showing a portion of a still differently modified converter.

Figure 1:
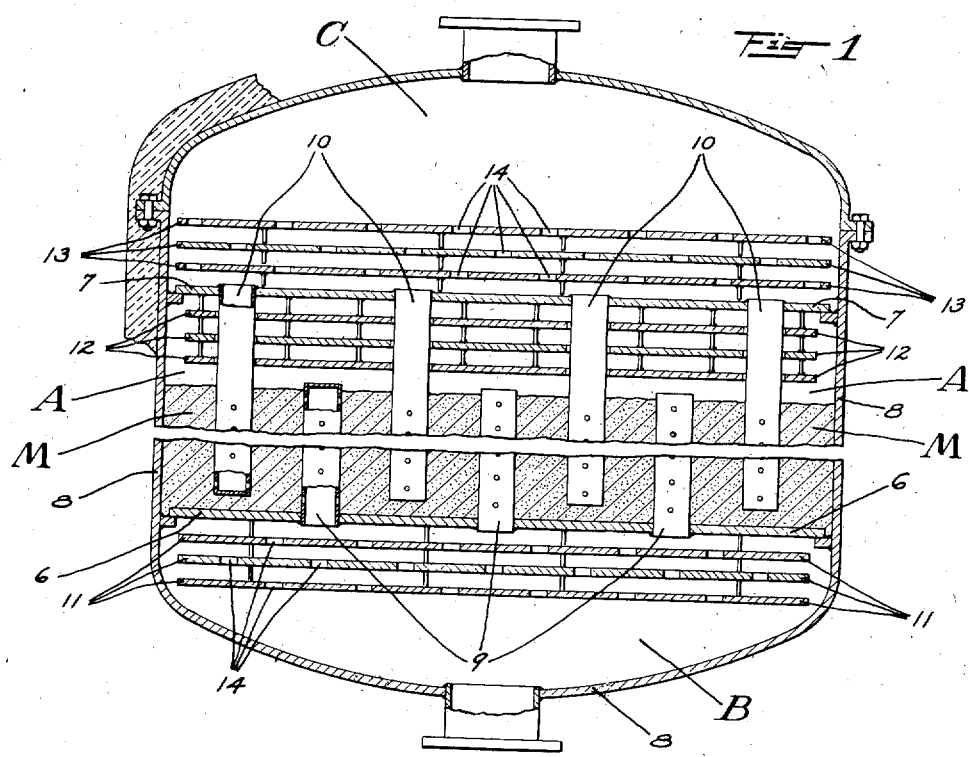
Fig. 1 is a view partially in section and partially in elevation of a converter having a central portion cut away.

In Fig. 1, flue sheets or partitions 6 and 7 extend across the converter shell or casing 8 dividing the interior of the latter into reaction chamber A containing contact mass M and end fluid manifolding chambers or reservoirs B and C. Fluid communication between each of the fluid reservoirs B and C and chamber A is provided in any desired manner, as for example, by a series of fluid conduits 9 mounted in flue sheet 6 and a series of fluid conduits 10 mounted in flue sheet 7, although other types of fluid communication are also contemplated as hereafter more fully explained. The converter provides baffle plates 11 in spaced relation with flue sheet 6 and disposed in reservoir B, and baffle plates 12 and 13 disposed in reaction chamber A and reservoir C respectively, and in spaced relation with flue sheet 7. Baffles 11, 12 and 13 divide chambers B, A, and C, respectively, into intercommunicating compartments and are supported from flue sheets 6 or 7 by means of suitable spacing members or legs. Baffles 11 and baffles 13 are shown provided with perforations 14 in staggered relationship. This arrangement permits passage of fluids through the baffles and over all the baffling surfaces and provides the effect of a continuous baffling surface presented to partitions 6 and 7, respectively. Baffles 12, except for the openings necessary for conduits 10, although shown imperforate, may be perforated or arranged in any suitable manner to permit sweeping of fluids over their surfaces. Baffles 11 and 13 function efficiently in restricting heat exchange between the respective flue sheets 6 and 7 and portions of the converter structure disposed outside reaction chamber A, as for example the ends of shell 8, when they are contacted by reaction products leaving mass M or fluid reactants about to enter mass M and which are at substantially the temperature of mass M. Baffles 12 restrict radiant heat exchange between mass M and flue sheet 7.

Figure 2:
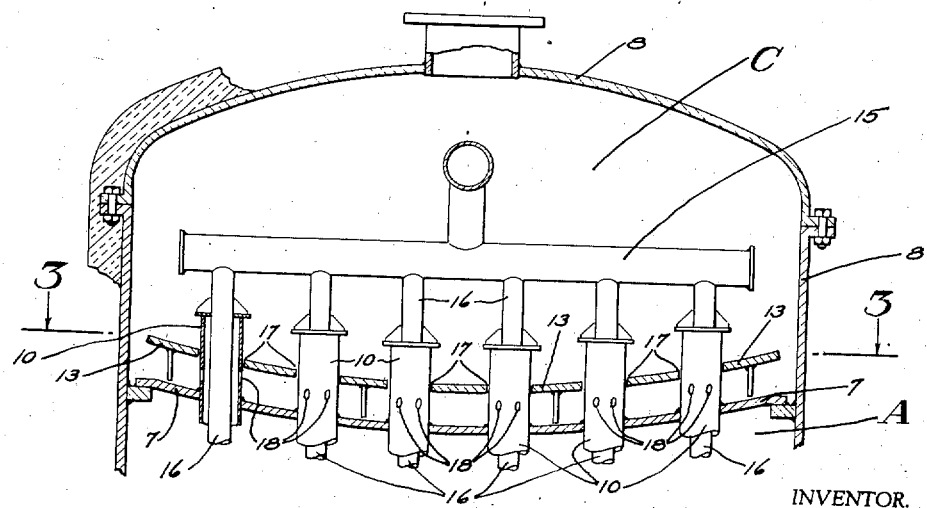
Fig. 2 is a sectional view of one end of a modified converter taken substantially along line 2—2 of Fig. 3, but showing some parts in elevation.

The converter shown in Figs. 2 and 3 provides means for conducting heating or cooling fluids through chamber A, such as fluid manifold 15 having a plurality of branches 16 in nested relation with fluid outlet conduits 10 extending into chamber A after the manner indicated in certain co-pending applications including Serial No. 728,544 of E. J. Houdry and R. C. Lassiat, filed June 1, 1934, Serial No. 8262 of E. J. Houdry and myself filed February 26, 1935, and Serial No. 12,564 of E. J. Houdry filed March 23, 1935. If desired, fluid manifolds, such as 15, are provided at each end of the converter and connected by conduits 16. Baffle plate 13 in spaced relation with and of smaller diameter than flue sheet 7 is interposed between the latter and manifold 15 and provided with perforations 17 accommodating the ends of conduits 10. Baffle 13 thus divides reservoir C into intercommunicating fluid compartments respectively removed from and adjacent to partition 7. Fluid reaction products are discharged or vented from chamber A through ports 18 (Fig. 2) in conduits 10 directly into the space or compartment provided between flue sheet 7 and baffle 13 and are directed by the latter toward the periphery of reservoir C before being admitted to the main portion of the latter.

In the modification shown in Fig. 4, baffle plate 13 is extended by means of wall 13a and cover 13b to form an inner shell providing a fluid conducting path D adjacent shell 8. Fluids about to enter or fluids leaving reaction chamber A are directed around the periphery of reservoir C without contacting manifold 15.

Fig. 5 discloses a somewhat different conduit porting arrangement in connection with the baffle plates. Conduits 10 having apertured ends 19 are shown extending through a portion of a flue sheet, indicated at 7, and baffle plates 13. In this arrangement a portion only of the fluids handled by conduits 10 are discharged into or picked up from the intercommunicating compartments provided by baffles 13 through perforations 18. It is to be understood that baffles 13 and ports 18 may be disposed on either or both sides of flue sheet 7, and that the latter may be approximately fluid-tight or not, as desired, depending for example upon the manner of passing reactants or other fluids from a fluid manifold or reservoir through catalyst or contact mass within the reaction chamber.

Fig. 6 discloses baffles adapted to permit free passage of fluids therethrough and accommodating fluid conduits 16. Baffle plates 13, interposed between fluid manifold 15 and flue sheet 7 accommodate manifold branch conduits 16 by means of aligned and alternately disposed larger and smaller perforations 21a. Free passage of fluids, through flue sheet 7 is, in this instance, provided by perforations 20 between conduits 16. The baffle plate or plates providing smaller perforations 21 also provide additional perforations 22 in alignment with perforations 20 in flue sheet 7 to complete a system of fluid ports in staggered relationship.

From the above it is apparent that the baffle plates, in many instances, function efficiently in the place of heat insulating material in restricting heat exchange between localized portions of a chemical converter, particularly when they are disposed in a stream of reaction products leaving the contact mass in the reaction chamber or in a stream of reactants about to enter the reaction chamber and which are at a temperature not widely variant from the temperature of the mass; that the baffles present advantages over the insulating material in avoiding the impairment of efficiency of the latter caused by absorbed fluids; that the baffles are easily adapted to prevent formation of pockets which hold stagnating fluids, and to avoid the fire and explosion hazards of stagnating inflammable fluids.

Although the heat baffles are capable of general application to restrict radiant heat exchange between the contact mass and localized portions of the converters, a particularly useful and valuable utilization of one or more baffles is between the contact mass and elements of a system for handling heat exchange fluid disposed outside the reaction zone, which elements are normally in radiant heat exchange relation with the zone and its contents. When it is desirable to control the temperature of a wall of the reaction chamber as well as the temperature of the contents of the chamber, all or a portion of the heat baffling means are interposed between the wall and the portions of the converter which tend to exert the undesirable temperature influence. Substantially all heat transfer between the reaction zone and other portions of the converter is eliminated when the baffle or baffles interposed therebetween are contacted by fluids which are at the same or approximately the same temperature as that obtaining in the interior of the reaction zone as when the baffling means are disposed in the stream of reaction products leaving the reaction zone or in the path of reactants for endothermic reactions entering that zone. The temperature influence of portions of the converter outside the reaction zone on reactants entering or reaction products leaving the latter is reduced to substantial extent or even practically eliminated when the heat baffles are arranged to prevent contact of the fluid and such portions of the converter.

I claim as my invention:

1. In a converter for effecting chemical reactions, a partition extending across said converter and defining one end of a reaction chamber and one end of a fluid reservoir, a contact mass in said chamber, heat baffling means in spaced relation with said partition and interposed between the latter and said mass, and heat baffling means in said reservoir in spaced relation with said partition.

2. In a converter for effecting chemical reactions providing a reaction chamber containing a contact mass and a reservoir in contiguity with said reaction chamber for reactants or for reaction products, a manifold for a heating or cooling fluid located in said reservoir, said manifold having branches extending into said mass for conducting said heating or cooling fluid in heat exchange relation but out of direct contact with said mass, and a plurality of heat baffling means in spaced relation with each other to provide an intervening free space between adjacent baffles which is in fluid communication with the aforesaid reservoir, said baffling means being disposed between said manifold and said mass, thereby to minimize the temperature influence of said manifold on the boundary portions of said mass.

3. In a converter for effecting chemical reactions providing a reaction chamber, a perforated partition defining the extent of said chamber and the extent of a fluid reservoir contiguous thereto, a contact mass in said chamber, a series of fluid conduits extending through the perforations in said partition and into said chamber to be surrounded by said mass, and a heat baffling plate disposed in said chamber in spaced relation with said partition and between the latter and said mass to divide said chamber into intercommunicating fluid compartments, said plate providing for passage of said conduits.

4. In apparatus for effecting chemical reactions, a partition defining one end of a reaction chamber and one end of a fluid reservoir, a contact mass in said chamber, a series of fluid conduits mounted in said partition and extending into said chamber to be embedded in said mass, a fluid manifold in said reservoir, a series of fluid conduits extending from said manifold into said chamber, and heat baffling means interposed between said partition and said manifold.

5. In a converter for effecting chemical reactions, a partition in said converter defining one end of a reaction chamber and one end of a contiguous fluid reservoir, a fluid manifold in said reservoir having branches extending through said partition and into said chamber, means for venting fluid reaction products from said chamber into said reservoir, and means interposed between said partition and said manifold for directing said reaction products toward the periphery of said reservoir and restricting heat exchange between said partition and said manifold.

6. In a converter for effecting chemical reactions, a partition dividing the space within said converter into a reaction chamber and a fluid reservoir, a fluid manifold in said reservoir, a plurality of fluid conduits communicating with said manifold and projecting through said partition and into said reaction chamber, a baffle plate in said reservoir in spaced relation with said partition and interposed between the latter and said manifold, and a series of fluid conduits mounted in said partition to extend into said reaction chamber and providing fluid communication between said chamber and the space between said baffle and said partition.

7. In a converter for effecting chemical reactions, a perforated partition defining one end of a reaction chamber and one end of a fluid reservoir, a baffle plate in said reservoir in spaced relation with said partition to divide said reservoir into intercommunicating fluid compartments, said baffle plate having perforations therein in alignment with the perforations in said partition, a series of conduits extending from said reservoir through the perforations in said baffle and said partition and into said reaction chamber, for providing fluid communication between said reservoir and said chamber, said conduits providing ports in the walls thereof between said baffle plate and said partition for establishing direct fluid communication between said chamber and the compartment adjacent said partition.

8. In a converter for effecting chemical reactions, a perforated partition defining one end of a reaction chamber and one end of a fluid reservoir, a baffle plate in said reservoir in spaced relation with said partition, said baffle plate having perforations therein in alignment with the perforations in said partition, a series of fluid conduits extending from said reservoir through the perforations in said baffle and said partition and into said reaction chamber, said conduits having means to discharge fluids from said reaction chamber into the space between said baffle plate and said partition and also into said reservoir beyond said plate.

9. In a converter for effecting chemical reactions providing a reaction chamber and a fluid reservoir adjacent said chamber, a contact mass in said chamber, manifolding means in said reservoir provided with branches extending into said mass to conduct a heating or cooling medium through said chamber, means providing fluid communication between said chamber and said reservoir, and means to conduct fluids about to enter or fluids leaving said chamber through said reservoir out of direct heat exchange relation with said manifolding means.

10. In a converter for effecting chemical reactions providing a reaction chamber and a fluid reservoir adjacent said chamber, means for conducting heating or cooling fluid through said chamber including a fluid manifold in said reservoir, means providing fluid communication between said chamber and said reservoir, and means to conduct fluids about to enter or fluids leaving said chamber around the periphery of said reservoir and out of direct heat exchange relation with said manifolding means.

11. In a chemical converter, a shell, a partition across said shell defining one end of a reaction chamber and one end of a fluid reservoir, a plurality of baffle plates in said reservoir in spaced relation with said partition to divide said reservoir into a plurality of intercommunicating compartments, said partition and said baffles providing perforations in alignment, a plurality of fluid conduits extending through said perforations into said chamber, said conduits having ports between said baffles and between said partition and the baffle adjacent thereto for providing direct fluid communication between said chamber and said compartment.

12. In a converter for effecting chemical reactions, a shell, a partition across said shell dividing the interior thereof into a reaction chamber and a fluid reservoir, a baffle plate in said reservoir in spaced relation with said partition, a plurality of fluid conduits mounted in said partition and extending into said chamber and through said baffle to provide fluid communication between said chamber and the space between said baffle and said partition, a fluid manifold in said reservoir beyond said baffle plate and having branches extending into said conduits to be in nested relation with the latter.

13. In apparatus for effecting chemical reactions, a converter shell, a partition across said shell dividing the interior thereof into a reaction chamber and a fluid reservoir, an inner shell within said reservoir dividing the latter into an inner chamber and an outer chamber, a fluid manifold within said inner chamber, conduit branches extending from said manifold through said outer chamber and into said reaction chamber, and means providing fluid communication between said reaction chamber and said outer chamber.

14. A converter for effecting chemical reactions comprising a casing providing a fluid reservoir and a reaction chamber for containing a contact mass, a partition between said reservoir and said chamber, means for venting reaction products from said reaction chamber through said partition into said reservoir, means for conducting a heating or cooling medium through said chamber including a manifold in said reservoir, and heat baffling means in said reservoir interposed between said manifold and said partition.

THOMAS B. PRICKETT.

CERTIFICATE OF CORRECTION.

Patent No. 2,102,644.   December 21, 1937.

THOMAS B. PRICKETT.

It is hereby certified that error appears in the printed specification of the above numbered patent requiring correction as follows: Page 3, second column, line 68, claim 11, for the word "compartment" read compartments; and that the said Letters Patent should be read with this correction therein that the same may conform to the record of the case in the Patent Office.

Signed and sealed this 15th day of February, A. D. 1938.

(Seal)

Henry Van Arsdale,
Acting Commissioner of Patents.

said baffle to provide fluid communication between said chamber and the space between said baffle and said partition, a fluid manifold in said reservoir beyond said baffle plate and having branches extending into said conduits to be in nested relation with the latter.

13. In apparatus for effecting chemical reactions, a converter shell, a partition across said shell dividing the interior thereof into a reaction chamber and a fluid reservoir, an inner shell within said reservoir dividing the latter into an inner chamber and an outer chamber, a fluid manifold within said inner chamber, conduit branches extending from said manifold through said outer chamber and into said reaction chamber, and means providing fluid communication between said reaction chamber and said outer chamber.

14. A converter for effecting chemical reactions comprising a casing providing a fluid reservoir and a reaction chamber for containing a contact mass, a partition between said reservoir and said chamber, means for venting reaction products from said reaction chamber through said partition into said reservoir, means for conducting a heating or cooling medium through said chamber including a manifold in said reservoir, and heat baffling means in said reservoir interposed between said manifold and said partition.

THOMAS B. PRICKETT.

CERTIFICATE OF CORRECTION.

Patent No. 2,102,644.   December 21, 1937.

THOMAS B. PRICKETT.

It is hereby certified that error appears in the printed specification of the above numbered patent requiring correction as follows: Page 3, second column, line 68, claim 11, for the word "compartment" read compartments; and that the said Letters Patent should be read with this correction therein that the same may conform to the record of the case in the Patent Office.

Signed and sealed this 15th day of February, A. D. 1938.

(Seal)

Henry Van Arsdale,
Acting Commissioner of Patents.

CERTIFICATE OF CORRECTION.

Patent No. 2,102,644.  December 21, 1937.

THOMAS B. PRICKETT.

It is hereby certified that error appears in the printed specificati(
of the above numbered patent requiring correction as follows: Page 3, secor
column, line 68, claim 11, for the word "compartment" read compartment:
and that the said Letters Patent should be read with this correction there
in that the same may conform to the record of the case in the Patent Offic( Signed and sealed this 15th day of February, A. D. 1938.

(Seal)

Henry Van Arsdale,
Acting Commissioner of Paten